(12) United States Patent
Phelon et al.

(10) Patent No.: US 8,398,490 B1
(45) Date of Patent: Mar. 19, 2013

(54) CAREER MANAGEMENT SYSTEM

(75) Inventors: Promise Phelon, San Jose, CA (US); Jamie Hull, San Mateo, CA (US)

(73) Assignee: Upwardly Mobile, Inc., Mountain View, CA (US)

( * ) Notice: Subject to any disclaimer, the term of this patent is extended or adjusted under 35 U.S.C. 154(b) by 0 days.

(21) Appl. No.: 13/048,831

(22) Filed: Mar. 15, 2011

Related U.S. Application Data

(60) Provisional application No. 61/314,364, filed on Mar. 16, 2010.

(51) Int. Cl.
  *G06F 17/00* (2006.01)
(52) U.S. Cl. ........................................ 463/42
(58) Field of Classification Search .......... 463/7, 16–25, 463/31, 40–42
  See application file for complete search history.

(56) References Cited

U.S. PATENT DOCUMENTS

| | | | |
|---|---|---|---|
| 7,164,076 B2 * | 1/2007 | McHale et al. | 84/616 |
| 7,806,759 B2 * | 10/2010 | McHale et al. | 463/7 |
| 2009/0144639 A1 * | 6/2009 | Nims et al. | 715/757 |
| 2011/0154254 A1 * | 6/2011 | Singh | 715/810 |

* cited by examiner

*Primary Examiner* — Ronald Laneau
(74) *Attorney, Agent, or Firm* — Fenwick & West LLP

(57) ABSTRACT

A career management system facilitates career management an online environment. The career management system introduces gaming elements to career management in order to make career-related tasks more enjoyable to participants. In one embodiment, a computer-based career management system generates a virtual career path customized based on a particular player's current career position and career goals. The virtual career path includes one or more challenges for the player to complete. The career management system tracks completion of the one or more challenges in the online environment and provides rewards and incentives as the player progresses.

20 Claims, 3 Drawing Sheets

CAREER MANAGEMENT SYSTEM

RELATED APPLICATIONS

This application claims priority from U.S. provisional application No. 61/314,364 filed on Mar. 16, 2010 and entitled "Career Hero," which is incorporated by reference herein in its entirety.

BACKGROUND

1. Field of the Art

The invention relates generally to career management, and more specifically to generating a tracking progress through a career path.

2. Background

Today, the average individual does not want to think about his or her career. It is a process that most view as tedious, cumbersome, and boring. And, for most, when they do think about their careers, it is superficial, tactical or point in time, or done so in a vacuum assuming the "career" is something that can be done without consideration of what others or the economy are doing. As a result, most careers are unmanaged and result in future challenges that limit lifestyle, earning and retirement, and mobility options. What is even more problematic is that although relationships contribute to 80% or more of the jobs found today, most professionals spend fewer than two hours a week actively managing those connections. In summary, careers and relationship networks lack management, connections suffer from low engagement, and only when individuals are looking for a new job do they invest time in activities remotely related to career or relationship management. The cost is weak ties, no clarity around goals and the extent which education, skills and other actions support those goals, and ultimately professional dreams unfulfilled.

SUMMARY OF THE INVENTION

A system, computer-readable storage medium, and computer-implemented method facilitates career management in an online environment and introduces gaming elements to career management in order to make career-related tasks more enjoyable to participants. In one embodiment, a computer-based career management system acquires, via a player user interface, preliminary player information from a player including a player's current career position and the player's future career goals. The career management system generates a virtual career path for the player based on the player's current career position and the player's future career goals. The virtual career path including one or more challenges for the player to complete in the online environment or the real world. The career management system then presents, via the player user interface, a visual representation of the virtual career path including the one or more challenges. The career management system tracks completion of the one or more challenges in the online environment. Completion of the one or more challenges causes the player to gain skills relevant to reaching the player's future career goals. In various embodiments, the one or more challenges may include, for example, a cooperative challenge involving one or more other players and/or a competitive challenge involving one or more other players. Responsive to the completion of the one or more challenges, the career management system indicates, via the player user interface, a representation of an award given to the player for completion of the one or more challenges. Furthermore, the career management system updates the player's progress on the virtual career path based on the one or more completed challenges.

In one embodiment, a player's progress through the virtual career path can include involvement from a member of the player's social network. For example, in one embodiment, the career management determines a member of the player's social network and shares the virtual career path with a member of the player's social network. The career management system then includes the member of the player's social network in at least one of the one or more challenges.

In one embodiment, the career management system provides a representation of the player's progress on the virtual career path to an employer enabling the employer to view the player's completed challenges. The career management system then provides a mechanism enabling the employer to contact the player.

In one embodiment, when the player achieves at least a threshold level of progress on the virtual career path, the career management system provides the player access to a job listing not previously available to the player, contact information for a professional service not previously available to the player, and/or an additional challenge not previously available to the player.

In one embodiment, the career management system further provides a game master interface that allows an entity to submit a customized challenge relevant to a particular career goal. The customized challenge may be reflective of skills desirable to reach the particular career goal. The career management system receives, via the game master interface a representation of the customized challenge, and presents, via the player interface, the customized challenge to the player.

In yet another embodiment, the career management system provides a co-player interface for receiving interactions from a co-player. The career management system presents, via the co-player interface, a request to assist the player in completion of the one or more challenges and receives, via the co-player interface, information for assisting the player. The career management system then provides, via the player interface, the information from the co-player to the player.

The features and advantages described in this summary and the following detailed description are not all-inclusive. Many additional features and advantages will be apparent to one of ordinary skill in the art in view of the drawings, specification, and claims hereof.

Figure 1:
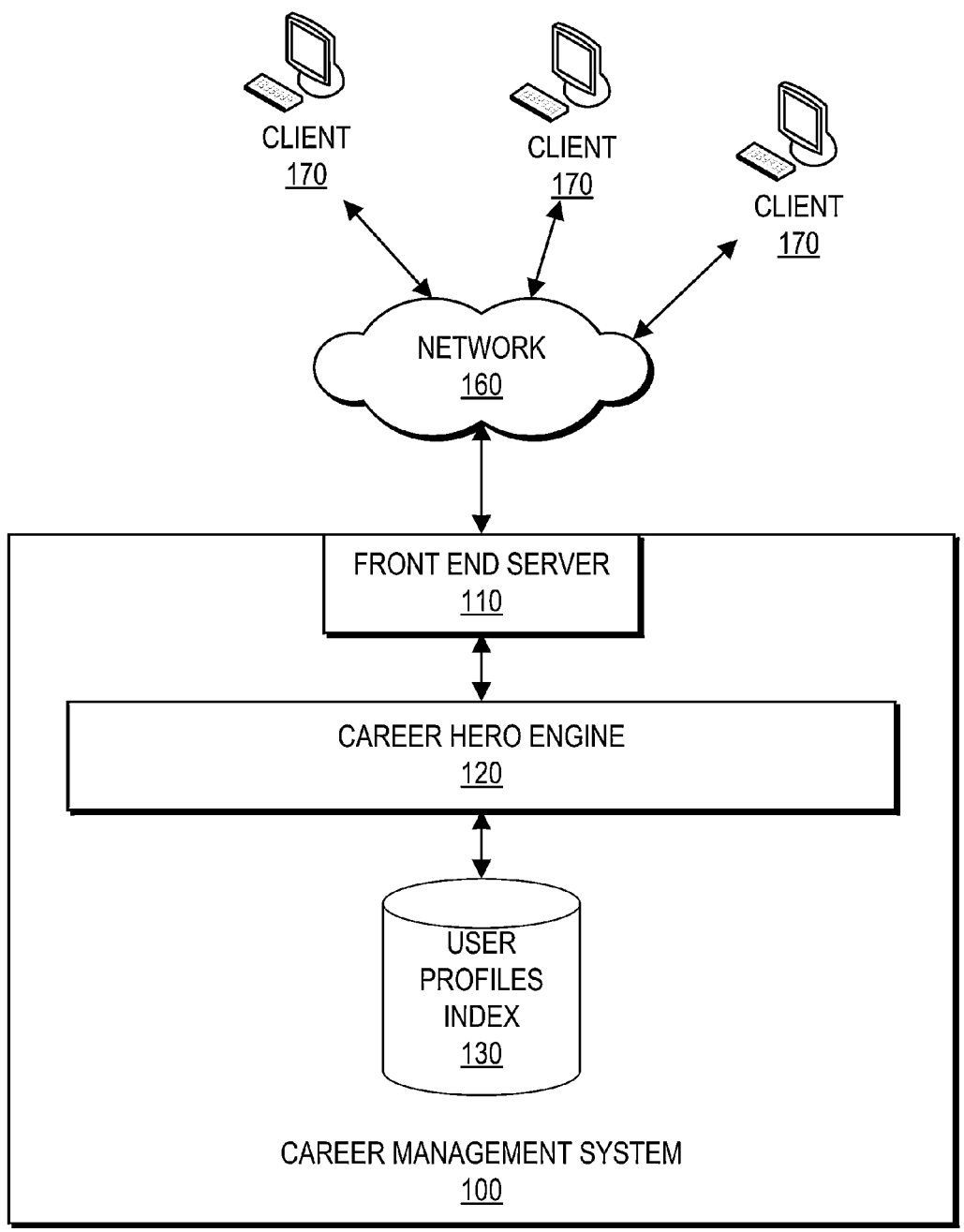
FIG. 1 illustrates a career management system in accordance with an embodiment of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A preferred embodiment of the present invention is now described. Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product which can be executed on a computing system.

The present invention also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

Overview

A web-enabled career management system facilitates participation in a social game, referred to herein as "Career Hero," that enables professionals to introduce game theory into their careers. The premise behind the game is three fold: 1) Careers call for defensible and "dominant" strategies—those can be created along with other smart people; 2) Success in landing a job or getting the career you want is impacted by others—their capabilities and their actions; and, 3) Career Management is boring—people desire an "edutaining" way to accomplish the same goal. Career Hero incorporates education in an entertaining way ("edutainment"), social gaming, and game theory (the act of building a dominant strategy that is both social and dynamic) with the career management principles of assessment, planning, skill building, problem solving and decision-making, and networking.

The purpose of the game is for its participants to make large-scale career decision, to then socialize those decisions and get continuous engagement, feedback and wisdom from the crowd of relationships they bring into the environment, as well as from coaches, mentors and other experts introduced to the environment by a career management service (e.g., Upwardly Mobile, Inc. of San Jose, Calif.) or by others facilitating mini-games within the environment. Through problem-solving, puzzles and simulated activities, the participants are also able to test and realize the tactical outcomes of their decisions while developing important career skills and creating close professional bond that extend from the virtual to the real world.

The game includes an environment (comprised of scenarios, puzzles and mini-environs) where individuals develop their career game plan and have their plan assembled into a series of games, challenges, scenarios, and puzzles. Players engage others in the assessment of probability and execution of that plan; begin acting on that plan by solving problems, puzzles and business cases together based on likeness, proximity in the network and the skills of that colleague or co-player. Players gain education and skills, learn lessons and are assisted by experts in ways that will help them in real life. The more skills, tools, techniques acquired, the more powerful the player. Players receive currency, feedback and inspiration from the results of ones actions keeping them motivated on their quest.

A possible scenario is that players can continuously or frequently play Career Hero in a social environment like Facebook, MySpace, Yahoo! and others. Players can also respond to challenges, engage others in activities, conversation, planning and dialog through other media such as cell phones and mobile devices, as well as get information through messaging and communication media such as Twitter, FriendFeed and RSS communications. The interactions within Career Hero help its players cultivate meaningful and close ties to individuals in their network, both personal and professional, as well as establish new relationships among the collection of players inside the game environment. Additionally, corporations can leverage Career Hero to add a new dimension to their hiring activities. For corporations seeking specialized, unique or high-potential talent, they can use Career Hero to source for hidden opportunities and to find senior talent, as well as to source players based on their mastery of non-obvious and behavioral skills such as their approach to competition, to partnering and leveraging resources.

System Architecture

FIG. 1 illustrates an embodiment of a career management system 100. The career management system 100 provides computer-implemented user interfaces and intelligent decision engines to facilitate participation in Career Hero. The career management system 100 maintains profiles for various users or players and generates a virtual career path specifically tailored to helping an individual reach his/her career goals. This path may include challenges that the user must complete to advance. The career management system 100 then tracks each user's progress through their path. The career management system 100 introduces game-like elements in its interactions with users such as providing rewards, tracking levels and skills, and allowing participants to represent themselves as virtual characters. These gaming elements enable the career management system 100 to facilitate career management in a manner that is fun and motivating for the participants. As used herein, the "game" refers to a set of computer-implemented rules, decisions, and user interaction enabled by the career management system 100. A user "plays" the game by providing inputs to the career management system 100, which the career management system 100 processes to determine and present various outputs according to the computer-implemented rules and decisions.

In one embodiment, the career management system 100 comprises a front end server 110, a Career Hero engine 120, and a user profile index 130. Those of skill in the art will recognize that other embodiments can have different modules than the ones described here, and that the functionalities can be distributed among the modules in a different manner. In addition, the functions ascribed to the various modules can be performed by multiple engines.

Each of the various components (alternatively, modules) e.g., front end server 110, Career Hero engine 120, user profiles index 130 is implemented as part of a computer system with one or more computers comprising a CPU, memory, network interface, peripheral interfaces, and other well known components. The computers themselves preferably run an operating system (e.g., LINUX), have CPUs, memory, and disk storage.

In one embodiment, the modules are stored on a computer readable storage device (e.g., hard disk), loaded into the memory, and executed by one or more processors included as part of the system 100. Alternatively, hardware or software modules may be stored elsewhere within the system 100. When configured to execute the various operations described herein, a general purpose computer becomes a particular computer, as understood by those of skill in the art, as the particular functions and data being stored by such a computer configure it in a manner different from its native capabilities as may be provided by its underlying operating system and hardware logic. It will be understood that the named components of the career management system 100 described herein represent one embodiment, and other embodiments may include other components. In addition, other embodiments may lack components described herein and/or distribute the described functionality among the modules in a different manner. Additionally, the functionalities attributed to more than one component can be incorporated into a single component.

FIG. 1 also illustrates three client devices 170 communicatively coupled to the career management system 100 over a network 160. The client devices 170 can be any type of communication device that is capable of supporting a communications interface to the system 100. Suitable devices may include, but are not limited to, personal computers, mobile computers (e.g., notebook computers), personal digital assistants (PDAs), smartphones, mobile phones, and gaming consoles and devices, network-enabled viewing devices (e.g., settop boxes, televisions, and receivers). Only three clients 170 are shown in FIG. 1 in order to simplify and clarify the description. In practice, thousands or millions of clients 170 can connect to the career management system 100 via the network 160.

The network 160 may be a wired or wireless network. Examples of the network 160 include the Internet, an intranet, a WiFi network, a WiMAX network, a mobile telephone network, or a combination thereof. The method of communication between the client devices 170 and the system 100 is not limited to any particular user interface or network protocol, but in a typical embodiment a user interacts with the career management system 100 via a conventional web browser of the client device 170, which employs standard Internet protocols.

The clients 170 interact with the career management system 100 via the front end server 110. The front end server 110 provides controls and elements that allow a user to provide inputs to the system 100 for processing by the Career Hero engine 120 and for presenting information from the Career Hero engine 120 to the user. Typically, the front end server 110 presents the interface to the career management system 100 in the form of a website including one or more web pages with which the user can interact via a conventional web browser.

The user profiles index 130 comprises an index of profiles associated with different users of the career management system 100. Each profile includes information related to the user, and particularly, related to the user's career goals. Examples of information stored in a user profile can include a user's name, current job, jobs of interest, current location, locations of interest, previously viewed job openings, previously applied for jobs, specific career goals, employment history, skills, people the user knows, activities the user participates in, short and long-term desires, impressions about the user from others, etc. In one embodiment, the user's profile also associates the user with a profile of one or more "role models." A role model is someone who has achieved the user's career goals, or is on a career path similar to that desired by the user. The role model may be, for example, a real-life person, a fictional person, or a composite of various people. The system 100 may store information about various role models including, for example, the role model's name, educational background, career path, accomplishments, skills, activities, reputation, personality, companies worked for, places of residence, etc.

In one embodiment, the user's profile also includes a list of other individuals that are linked to the user through a social network. Users can link to each other within the career management system 100 to reflect a relationship through friendship, employer, professional area, schools attended, home location, or any other criteria linking the users together. Additionally, a user's profile can indicate social network relationships on external social networking sites such as, for example, facebook.com, myspace.com, linkedin.com, etc.

The Career Hero engine 120 comprises computing elements for carrying out the functions described below. For example, in one embodiment, the Career Hero engine 120 comprises one or more processors and a computer-readable storage medium storing computer-executable program instructions. In operation, the one or more processors load the computer-executable program instructions into memory and executes the instructions. The Career Hero engine 120 receives inputs from participants (via clients 170), implements rules or decisions based on the inputs, and generates outputs for transmission to the participants (via the clients 170) as will be described in further detail below.

For clarity of description, the described embodiments that follow are discussed in the context of a "game." The various processes, interactions, and decisions involved in the game are implemented by the career management system 100. For example, interactions by users or players can be implemented by receiving user inputs via an input device on a client 170 and transmitting the inputted information to the career management system 100 via the network 160. Decisions made by the game or rules carried out by the game may be implemented by processing inputs according to the program instructions of the career management system 100. Furthermore, outputs of the game may be implemented by transmitting information from the career management system 100 to a client 170 via the network 160 so that the client 170 can render the information to the user via a display and/or audio output device.

Purpose of the Game

The Career Hero game is designed to assist participants in building career plans that result in game experiences that can be a) evolved, b) executed, c) engaged in by others, d) informed and impacted by the individuals with similar paths, and, e) accelerated or affected by players in the community. Furthermore, the Career Hero game is designed to allow players to gain experience, skills and knowledge that would be difficult to acquire in the real world or workplace. Additionally, the Career Hero game helps participants foster tighter relationships with existing networks and build expanded networks by simulating important elements of relationship-building, experience solving problems and building trust.

Player Experience

The game allows players of Career Hero to interact inside of a social space with other players and avatars of players. The game is designed to be both collaborative—players and co-players partnering to get more points and reach higher levels in the game—and competing for the same outcomes, as well as competing for access to a limited number of seats or spaces.

The game is heavily social, so it may be played on a destination site, as well as all of the social sites (Facebook, Yahoo!, MySpace, LinkedIn) and via mobile interface such as using an iPhone application. Additionally, a version of the online game in the form of a simulator (application) can be downloaded to one's laptop or server environment and configured for a specific corporate or workgroup.

Participants

Participants in the Career Hero game may include individuals at any stage of career transition. Furthermore, members of a player's social network may participate by providing advice or feedback to players. These members of a player's social network may participate in player challenges and can be recruited from other social networks into the game to help in specific challenges or for advice in general. Corporations (e.g., hiring managers, executives, etc.) who seek access to players can build challenges and puzzles for other players. Educators (e.g., college and university professors, counselors, administrators, career services managers) can help players achieve goals by creating challenges, building skills and rapidly accelerating a player's path to their ultimate destination. Furthermore, coaches or experts in areas can build skills of players or assist in the problem-solving process.

Role of Participants

There are multiple roles in the game. The following outlines some possible roles and it is envisioned that additional roles can be used. A participant may have multiple roles in the game. For example, a participant may act as a player in his/her own game and may act as a medic/wizard, aid, or hero in other players' games. Examples of roles are now described below.

A "player" defines his or her path and travels through that path while interacting with situations and other users. Players can also be competitors of other players and at certain levels of mastery can be allowed to set traps for other players.

A "player's aid" or co-player" may be an individual who is not directly engaging in the game but is invited by the player to somehow participate in an activity or set of actions. The co-player may be invited via a message/invitation from the game to answer a question or to get involved in addressing a challenge with the player or give (or temporarily lend) the player gifts, powers, or skills they may lack. Unless the co-player or aid is a member of the community, their impact on the player is limited to either a point in time or to a set of actions. In one embodiment, a co-player interacts with career management system 100 via a co-player interface that may present requests to assist a player in completion of one or more challenges, receives the relevant information from the co-player, and provides it to the player.

A "game master" may be a player who has reached some level of Career Hero status, a corporation or agency, or a set of individuals who have special experience knowledge and are granted permissions to construct and manage a mini-game within the overall game. The game master sets up customized mini-games or unique environments for a community of players to interact around a specific goal and objective. (For instance, a recruiter or hiring manager can set up a business case for individuals seeking a job or access to an opportunity.) In one embodiment, a game master interacts with the career management system 100 via a game master interface that allows an entity to submit a customized challenge relevant to a particular career goal. These communities would reflect the attributes of whatever environment aligned with the skills, culture, etc. of the sponsoring Game Master. For instance, an investment banking firm would erect a competitive environment with challenges such as sword fighting, wrestling, etc.

A "medic/wizard" is a non-playing character who interacts with players by assessing the challenges of the player, and the medic/wizard (often a coach or career expert in real life) helps to accelerate the diagnosis of problems and unseen skill limitations, and facilitates movement through levels of play.

A "hero" is an individual player who has reached a certain level of status (e.g. has reached his or her career goals) who provides specific, as well as strategic, guidance to the career plan or path of the individual. This person does not need to be connected to the individual but can help others solve problems they've already solved in the game. As a Hero, a player has access to information, job opportunities and other players. Challenges are designed for career heroes to complete cooperatively and are broken into groups based on skill levels and mastery.

A "puzzle master" is an individual in the community who build unique traps, scenarios, challenges, puzzles, and obstacles for others.

A "model" is an individual whose career path (in the real-world) can be emulated or followed. It is the model's path who the player picks at the outset. The Model, who is not necessarily a player or Hero of the game, will respond to specific questions such as, for example, how did you build powers to move from competing financial services (number cruncher) to being a venture capitalist (mob boss)?

Basic Play and Progression

Figure 2:
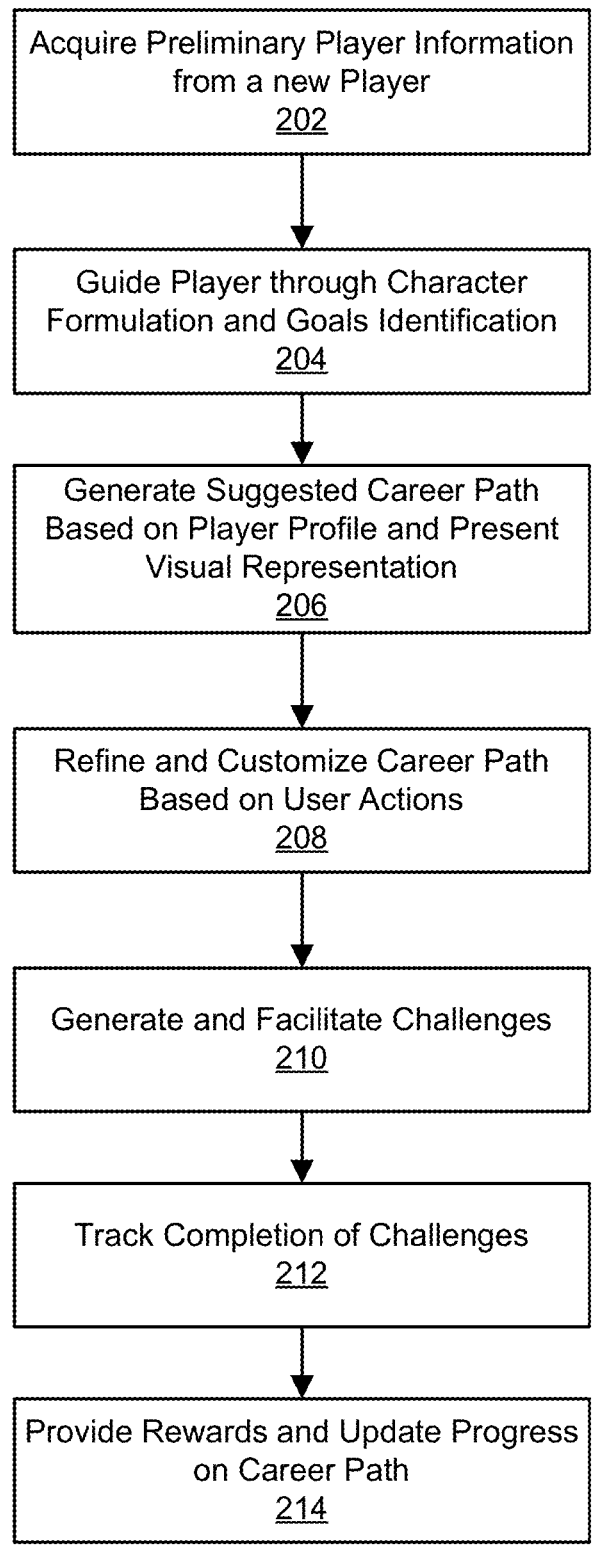
FIG. 2 is a flowchart illustrating a process performed by the career management system for facilitating career management, in accordance with an embodiment of the present invention.

FIG. 2 illustrates an embodiment of a process performed by the career management system 100 for career management via the Career Hero game. At the beginning of the game, the career management system 100 presents a player user interface (e.g., a web-based interface) to acquire 202 preliminary player information from a new player. For example, the career management system 100 may obtain user responses to various requests (e.g., provide profile link or resume) or questions. Players provide identifying information about themselves—either providing a professional profile (such as a LinkedIn or Facebook profile) or resume upload. The preliminary player information may comprise, for example, the player's current career position and the player's future career goals. The Career Hero engine 120 then processes these inputs to make assumptions about the player and draws a set of conclusions about the player's desires or goals. This information may be stored to a user profile in the user profile index 130 players.

The career management system 100 then guides 204 players through a character formulation and goals identification setup (e.g., via a sequence of user interface screens). During this process, players choose a character type that implies certain attributes (personality characteristics, skills, goals, emphasis of strength on certain skills, etc.) and sets their career goals for the game (job role, level, function, industry, etc.). Players may also pick a model, an individual who's reached a certain level of career mastery, to emulate at which point the set up is automated. Following completion of this setup process, the Career Hero engine 120 generates a suggested career path for players that will enable them to reach their goals. In one embodiment, the generated career path is based on the player's current career position and the player's future career goals.

The career management system 100 generates 206 and presents a visual representation of a suggested career path designed by the Career Hero engine 120. For example, in one embodiment, the career management system outputs interface screens so that the player can see his or her path emerge based on where he or she is today and wants to be. The path to those goals becomes speckled with challenges, skills, competitions, puzzles, and other activities necessary to get to the ultimate destination. The player can see this visually and a path to his or her destination (and the players distance from it) remains visible as he or she plays. Thus, this visualization may be updated in real-time as the user progresses.

The career management system 100 then refines and customizes 208 the suggested career path based on user inputs. For example, players can configure their suggested progression path directly as well as send it to their social network (co-players) for feedback and refinement. Each player's path can be broken down into a series of steps or levels with a defined set of challenges (skills mastered, experience points earned, games/quizzes completed, etc.) required to move between each level. The player's social network can be informed of the path and may begin volunteering for specific challenges or can suggest different puzzles for the player or they can offer tools and weapons, knowledge, etc. (For non-playing aids and co-players, they raise their visibility inside the game and other players can identify them based on the points they have accumulated from assisting.)

The career hero engine 120 may generate 210 challenges for players as will be described in further detail below, and present the challenges to users via the user interface. Completion of challenges can earn experience points toward a player's next level, skill points toward a set of achievements or skill masteries, as well as currency that can be spent both inside the environment and in the real world. Furthermore, completion of challenges may cause the player to gain real world skills relevant to reaching the player's future career goals. At the lower levels, play can be tied to the game's design and challenges can be architected by the system and are closely linked to a player's path. At the higher levels, play can be more competitive and the challenges and puzzles can be also be designed and placed by other players, by game- and puzzle-masters and by participating corporations. Reliance on medics (coaches) and aids (co-players) is greater. At the highest levels, players have access to very difficult challenges and puzzles at which point, they can rely more heavily on the skills of other players, Career Heroes and Models. In doing so, they are building networks of relationships they would have otherwise never had.

The career management system 100 tracks 212 completions of challenges. When challenges are completed, the career management system 100 may provide 214 rewards and updates to progress along the career path. Leveling up gives access to more interesting challenges, access to higher-point challenges that translate into more currency. Skill mastery achievements give access to Career Hero status and access to jobs, hiring managers and other players who can help the player in the real world.

Challenges

Career paths and plans can be broken into a set of challenges, mini-games and other experiences. The underlying framework of the Career Hero engine 120 assesses the skills required to reach a specific level or stage in one's career and of the game. Individuals can be assigned challenges based on their natural career plan and get obstacles presented that will help them build skills essential to reaching a goal or milestone—these are defined by the underlying Career Hero framework and then enhanced by players and coaches, and accelerated by acquiring certain knowledge or skill.

The career management system 100 can also present challenges based on a) feedback from coaches or their network of relationships, or b) can emerge because of the number of others on their path has grown or the powers of those individuals is higher than the player. In this instance, when the players "powers" or skill level drops below that of the other player, they will need to complete challenges to stay on their path. And, c) if an individual is interested in changing paths or garnering interest from an employer for a skill they may not have, a challenge designed to build that particular skill will be presented. The content for skills training would come from training content providers, educational institutions or individual puzzle masters.

Types of Challenges

An "experimental challenge" is a challenge that allows an individual to discover a new set of skills or to discover the opportunity to move to a path that they had not considered. For instance, a bookkeeper might realize after completing a challenge that he or she would be an effective mediator or copywriter. An "entrepreneur challenge" might involve a challenge related to building a company, to selling a company, or to gaining financing for that company. A "company management challenge" might involve a challenge related to facilitating a meeting, to disciplining or inspiring an employee, to navigating company politics, or to having a difficult conversation with a manager or organizational leader. A "banking challenge" might involve a challenge related to facilitating a hostile takeover of an organization.

An "assessment challenge" is a challenge that is designed to assess the skills of a player. The Career Hero engine 120 determines an assessment of their communication, management, financial, or other vocational skills discovered through a situation where multiple options are made available, and assesses how the individual completes the "course" or challenge.

A "development challenge" is a challenge structured to help individuals develop tactical, strategic, management/leadership, and vocational skills. These challenges may be created and offered by an accredited online or offline university.

Review of Challenges

Challenges can be rated, bookmarked/tagged and voted on by the game community—level of difficulty, quality, efficacy of challenges. There can be feedback about each challenge that allows others to rate and verbally comment on the challenge. Players can receive points for their comments, and ratings can be required for a player to exit a set of challenges and proceed to the next. The net result could be that the issuer of the challenge(s) receives a score based on some aggregate of the ranking of their challenges—the aggregate score could apply to an individual, group, company, organization, guild, entity, union, etc. Challenges can be constructed and issued by others who play or are involved in the game in a variety of manners.

Assessment of Skills, Powers, and Other Points Needed to Level

Underpinning the game is a framework of skills and competencies required to meet each challenge and to achieve major and minor career goals. At lower levels there is a close tie between challenges the player experiences and the framework. At mid-level play, the player is involved in more cooperative and competitive play and the skills/powers are more tied to those of the other players; and the highest levels, the goal is to become a career hero—this level of play is highly competitive, requires experts and the challenges are created by corporations and high-level game masters. Once a player has reached this level, they are more likely to be a hero in their career, thus they can get access to people and opportunities that help them get there.

Portfolio

Employers, recruiters and industry observers can actively monitor the players of Career Hero. For example, in one embodiment, the career management system 100 provides a representation of the player's progress on the virtual career path to an employer that reflects the player's completed challenges, and provides a mechanism enabling the employer to contact the player. Players can publish their stats from a MyCareerHero Internet portal, for example, which allows non-players to track the activity, status, challenge completion, and mastery of the players. Additionally, players may send the summary statistics via email or other communication to colleagues, hiring managers and recruiters which detail their career plan or path, the attributes of their avatar, challenges and puzzles they have completed and opportunities of interest. External parties can connect with players via the game's messaging system or through other media such as email, Twitter, FaceBook, or their mobile device. External parties can also replay the player's moves and strategies within a given game.

Social Interactions

Players may cooperate with other players. For example, in one embodiment, the career management system 100 determines a member of the player's social network, shares the player's virtual career with the member of the social network, and includes the member of the social network in at least one of the player's challenges. As players reach higher levels in the game, they build alliances with other players and cohorts of players as they collaborate on tough, team-specific challenges. In some situations game-masters may assign players to work together within a specific mini-game or environment; either to build a specific type of skill among similar character types or to encourage cross-functional team work among various character types.

Players may also receive support from Aids/Co-Players. Players will invite their colleagues into the game environment as either members of an entourage or a workgroup solving problems together (additional players); or on an ad-hoc basis to provide one-off support and information (co-players).

Players may compete with other Players. Players compete with characters on similar tracks at the highest levels in the game to earn the few, coveted Career Hero badges and recognition as experts within their career track.

Players may participate in group learning via Experts. Learning Labs are places within the game where players go to acquire skills by taking courses and gathering knowledge directly from experts, etc. Players may interact with each other within the learning labs but are not directly in competition in this environment.

Players may share activities via their social networks. Players may choose to share their activities—games played, progress made, quizzes taken—with any number of social networks (either limited to the environment in which the game is placed, or open to any API accessible social network). This serves a two-fold purpose of keeping a player's network informed of progress as well as driving viral interest in the career hero game via the social network channels.

Monetization

In one embodiment, the career management system 100 includes computer-implemented tools for facilitating monetization of Career Hero. Career Hero may be monetized through virtually any member of the career ecosystem (corporations, universities, recruiters, advertisers for relevant goods and services, etc.) or via individual players—in any number of ways. For example, Game & Puzzle masters, individuals or organizations who build puzzles and large-scale challenges, can sell their challenges either at the point of entry or completion, or sell the right to accelerate past obstacles within a challenge. Furthermore, the career management system 100 can facilitate monetization through advertising & sponsorships. Corporations and other organizations can sponsor challenges. They can also have advertisements within the environment such as buildings, billboards, tools, etc.

In one embodiment, players can pay to share their portfolios (stats page, scroll of player results, highlight replays) with outside entities—such as hiring, managers, and recruiters.

In another embodiment, game masters can pay to create a mini-game or custom environment based around their specific recruitment or hiring needs. The backing corporations/individuals get access to statistics about the players in their games and can choose to reach out to those players who best match the skills the environment is designed to surface.

The career management system 100 can also facilitate posting of jobs and opportunities. Inside of the community there can be a job board or set of boards that can only be accessed by players of a certain level or skill mastery. Recruiters, corporations, hiring managers and individuals can pay to have their opportunity placed where it will be accessed by the most relevant, skilled group of players.

The career management system 100 may facilitate access to resumes or profiles and portfolios. Recruiters, corporations, hiring mangers and other associations, etc. can pay to get access to certain types of players based on skill mastery, career path, level, etc.

The career management system 100 may facilitate announcements and communications to players by non-players. Businesses, universities, career management services, etc. can pay to announce events, seminars, recruitment fairs, important dates (class registration deadlines) to some or all of the Career Hero players.

The career management system 100 may facilitate acceptance of virtual currency. Players can earn virtual currency as they progress through the game via skill points, masteries, and leveling. This currency may be exchanged both for in game items and for real world goods/services. Individuals can also use outside money to purchase currency inside the environment. Companies may pay for the opportunity to "sponsor" an in-game item (product placement) or to list their real world items for sale in the Career Hero marketplace.

Player Motivation

The career management system 100 may provide in-game rewards to facilitate player motivation. Player mastery of lower, mainly system driven, levels and corresponding challenges opens access to the higher-level, cooperative and competitive challenges. Players are encouraged to continue along this trajectory through continuous feedback on their progress and tracking against goals. Skill mastery is tracked through a tiered achievements or badge structure to provide progression paths at all levels in the game. Individuals with higher skill points or at certain path-defined levels get access to successful business people and celebrities who can help them achieve more points or access higher levels. Virtual currency can be exchanged for in-game items—time with coaches, special tools, power-ups, etc.—to aid in progression through the game.

The career management system 100 may also motivate players thorough facilitating real world benefits. In an embodiment, only players with large skill points (badges earned/masteries) in relevant areas can view/experience job and career opportunities that are not posted on standard job sites and boards. For example, in one embodiment, when a player achieves a threshold level of progress on the career path, the career management system 100 provides the player with acces to job listings, contact information for professional services, and/or additional challenges not previously available to the player. Skill points translate into exposure on social sites, in resumes and on resume posting sites and on job boards as an expert in certain skill areas (effective networker, effective leader and manager, etc.). Virtual currency can be spent at the Career Hero marketplace for real world items—office supplies, services, education credits, etc. The game can feature an externally-published listing of the participants with the highest score in a leaderboard format allowing external hiring managers, recruiters and other colleagues to find the best rated player (candidate) in a certain role, industry, or function.

The career management system 100 may also facilitate benefits to co-players and aids. Aid points can be accumulated by co-players or aids recruited into the game. These points can be converted into player or skills points if the co-player becomes a player or, if not, the co-player will gain visibility among other players for their power as an aid thus garnering them invitations from other players.

Figure 3:
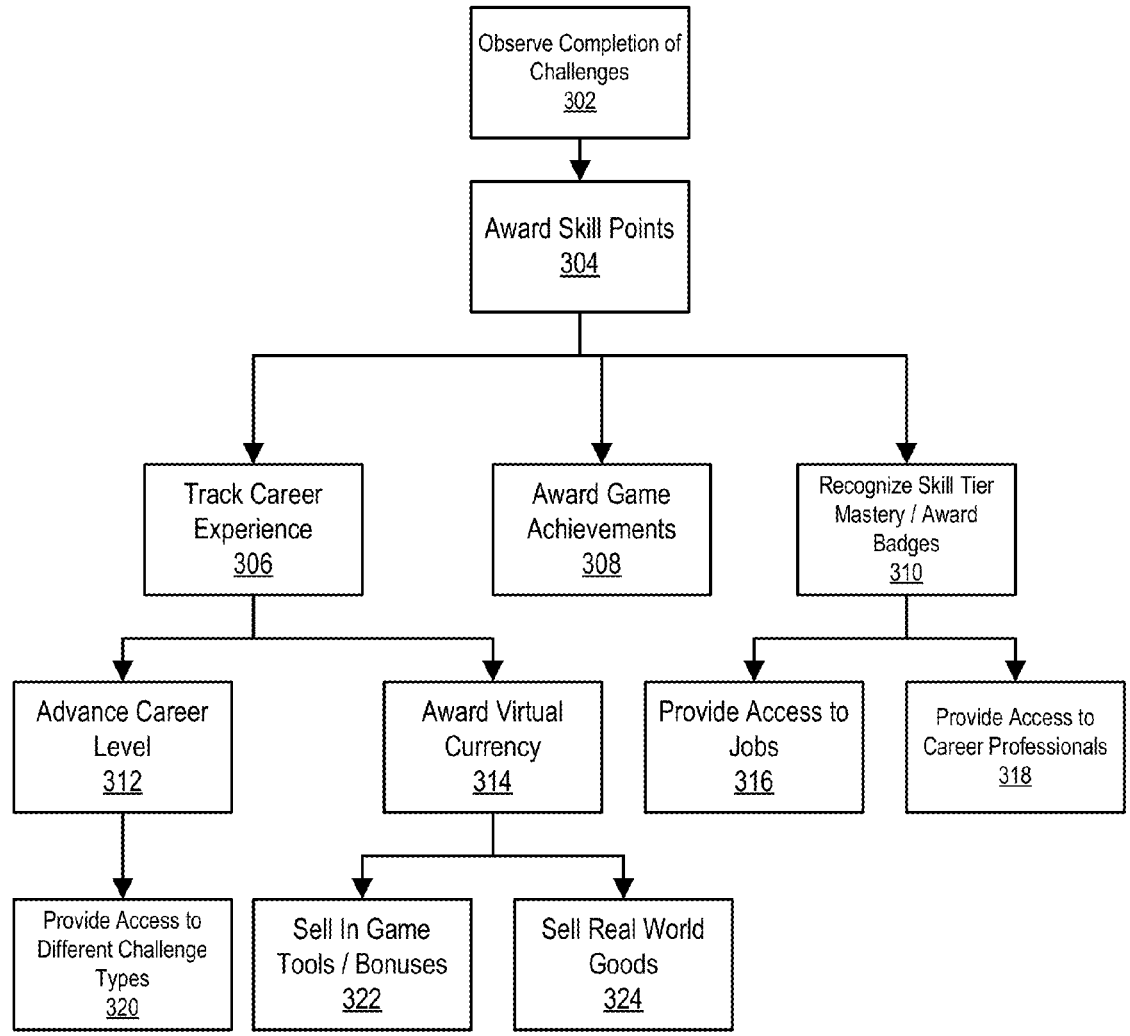
FIG. 3 is a flowchart illustrating an example of progression through a career management-based game in accordance with an embodiment of the present invention.

FIG. 3 is a flowchart illustrating an example of a process performed by the career management system 100 as a user progress through the Career Hero game. The career management system 100 observes 302 completion of challenges by the player and awards 304 skill points based on the completed challenges. The skill points can be utilized in different ways. First, the career management system 100 may utilize the skill points as a way to track 306 the player's career experience. For example, more skill points suggest that the player has a greater level of experience suitable for a particular career. Second, the career management system 100 may award 308 game achievements based on skill point (e.g., when the skill points rise above a particular threshold). Third, the career management system 100 may recognize 310 skill tier mastery and/or award achievement badges based on the skill points. The career management system 100 may provide 316 access to jobs or may provide 318 access to career professionals based on skill tier mastery and/or achievement badges (e.g., a particular job listing may be accessible only to a player having a particular achievement badge or skill tier mastery).

As the career management system 100 tracks 306 increasing career experience, the system 100 may advance 312 a player's career level and/or may award 314 virtual currency. Advancing 312 to a new career level may provide 320 the player with access to different types of challenges than previously available. The virtual currency may be used to sell 322 players in game tools and/or bonuses or to sell 324 real world goods.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention.

The invention claimed is:

1. A computer-implemented method for facilitating career management in an online environment, the method performed by a computer, the method comprising:
   acquiring via a player user interface, preliminary player information from a player including a player's current career position and the player's future career goals;
   generating a virtual career path for the player based on the player's current career position and the player's future career goals, the virtual career path including one or more challenges for the player to complete in the online environment, wherein completion of the one or more challenges causes the player to gain skills relevant to reaching the player's future career goals;
   presenting, via the player user interface, a visual representation of the virtual career path including the one or more challenges;
   tracking completion of the one or more challenges in the online environment; and
   responsive to the completion of the one or more challenges, indicating via the player user interface, a representation of an award given to the player for completion of the one or more challenges, and updating the player's progress on the virtual career path based on the one or more completed challenges.

2. The computer-implemented method of claim 1, further comprising:

determining a member of the player's social network;
sharing the virtual career path with a member of the player's social network; and
including the member of the player's social network in at least one of the one or more challenges.

3. The computer-implemented method of claim 1, further comprising:
providing a representation of the player's progress on the virtual career path to an employer, the representation reflecting the player's completed challenges; and
providing a mechanism enabling the employer to contact the player.

4. The computer-implemented method of claim 1, further comprising:
responsive to the player achieving a threshold level of progress on the career path, providing the player access to at least one of: a job listing not previously available to the player, contact information for a professional service not previously available to the player, and an additional challenge not previously available to the player.

5. The computer-implemented method of claim 1, further comprising:
providing a game master interface for allowing an entity to submit a customized challenge relevant to a particular career goal, the customized challenge reflective of skills desirable to reach the particular career goal;
receiving via the game master interface a representation of the customized challenge; and
presenting via the player interface, the customized challenge to the player.

6. The computer-implemented method of claim 1, further comprising:
providing a co-player interface for receiving interactions from a co-player;
presenting via the co-player interface, a request to assist the player in completion of the one or more challenges;
receiving via the co-player interface, information for assisting the player; and
providing via the player interface, the information from the co-player to the player.

7. The computer-implemented method of claim 1, wherein the one or more challenges comprises at least one of: a cooperative challenge involving one or more other players, and a competitive challenge involving one or more other players.

8. A non-transitory computer-readable storage medium storing computer-executable instructions for facilitating career management in an online environment, the instructions when executed by a processor cause the processor to perform steps including:
acquiring, via a player user interface, preliminary player information from a player including a player's current career position and the player's future career goals;
generating a virtual career path for the player based on the player's current career position and the player's future career goals, the virtual career path including one or more challenges for the player to complete in the online environment, wherein completion of the one or more challenges causes the player to gain skills relevant to reaching the player's future career goals;
presenting, via the player user interface, a visual representation of the virtual career path including the one or more challenges;
tracking completion of the one or more challenges in the online environment; and
responsive to the completion of the one or more challenges, indicating via the player user interface, a representation of an award given to the player for completion of the one or more challenges, and updating the player's progress on the virtual career path based on the one or more completed challenges.

9. The non-transitory computer-readable storage medium of claim 8, the instructions when executed further causing the processor to perform steps including:
determining a member of the player's social network;
sharing the virtual career path with a member of the player's social network; and
including the member of the player's social network in at least one of the one or more challenges.

10. The non-transitory computer-readable storage medium of claim 8, the instructions when executed further causing the processor to perform steps including:
providing a representation of the player's progress on the virtual career path to an employer, the representation reflecting the player's completed challenges; and
providing a mechanism enabling the employer to contact the player.

11. The non-transitory computer-readable storage medium of claim 8, the instructions when executed further causing the processor to perform steps including:
responsive to the player achieving a threshold level of progress on the career path, providing the player access to at least one of: a job listing not previously available to the player, contact information for a professional service not previously available to the player, and an additional challenge not previously available to the player.

12. The non-transitory computer-readable storage medium of claim 8, the instructions when executed further causing the processor to perform steps including:
providing a game master interface for allowing an entity to submit a customized challenge relevant to a particular career goal, the customized challenge reflective of skills desirable to reach the particular career goal;
receiving via the game master interface a representation of the customized challenge; and
presenting via the player interface, the customized challenge to the player.

13. The non-transitory computer-readable storage medium of claim 8, the instructions when executed further causing the processor to perform steps including:
providing a co-player interface for receiving interactions from a co-player;
presenting via the co-player interface, a request to assist the player in completion of the one or more challenges;
receiving via the co-player interface, information for assisting the player; and
providing via the player interface, the information from the co-player to the player.

14. The non-transitory computer-readable storage medium of claim 8, wherein the one or more challenges comprises at least one of: a cooperative challenge involving one or more other players, and a competitive challenge involving one or more other players.

15. A system for facilitating career management in an online environment, the system comprising:
one or more processors; and
a non-transitory computer-readable storage medium storing computer-executable instructions, the instructions when executed by the one or more processors cause the one or more processors to perform steps including:
acquiring, via a player user interface, preliminary player information from a player including a player's current career position and the player's future career goals;

generating a virtual career path for the player based on the player's current career position and the player's future career goals, the virtual career path including one or more challenges for the player to complete in the online environment, wherein completion of the one or more challenges causes the player to gain skills relevant to reaching the player's future career goals;

presenting, via the player user interface, a visual representation of the virtual career path including the one or more challenges;

tracking completion of the one or more challenges in the online environment; and responsive to the completion of the one or more challenges, indicating via the player user interface, a representation of an award given to the player for completion of the one or more challenges, and updating the player's progress on the virtual career path based on the one or more completed challenges.

16. The system of claim 15, the instructions when executed further causing the one or more processors to perform steps including:

determining a member of the player's social network;

sharing the virtual career path with a member of the player's social network; and including the member of the player's social network in at least one of the one or more challenges.

17. The system of claim 15, the instructions when executed further causing the one or more processors to perform steps including:

providing a representation of the player's progress on the virtual career path to an employer, the representation reflecting the player's completed challenges; and providing a mechanism enabling the employer to contact the player.

18. The system of claim 15, the instructions when executed further causing the one or more processors to perform steps including:

responsive to the player achieving a threshold level of progress on the career path, providing the player access to at least one of: a job listing not previously available to the player, contact information for a professional service not previously available to the player, and an additional challenge not previously available to the player.

19. The system of claim 15, the instructions when executed further causing the one or more processors to perform steps including:

providing a game master interface for allowing an entity to submit a customized challenge relevant to a particular career goal, the customized challenge reflective of skills desirable to reach the particular career goal;

receiving via the game master interface a representation of the customized challenge; and presenting via the player interface, the customized challenge to the player.

20. The system of claim 15, the instructions when executed further causing the one or more processors to perform steps including:

providing a co-player interface for receiving interactions from a co-player;

presenting via the co-player interface, a request to assist the player in completion of the one or more challenges;

receiving via the co-player interface, information for assisting the player; and providing via the player interface, the information from the co-player to the player.

* * * * *